July 24, 1951  L. BERTELE  2,562,012
THREE COMPONENT OBJECTIVE LENS SYSTEM
Filed Sept. 9, 1948
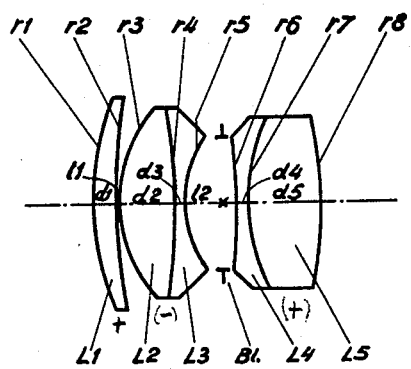
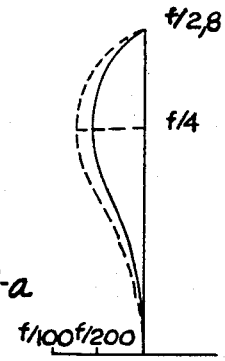
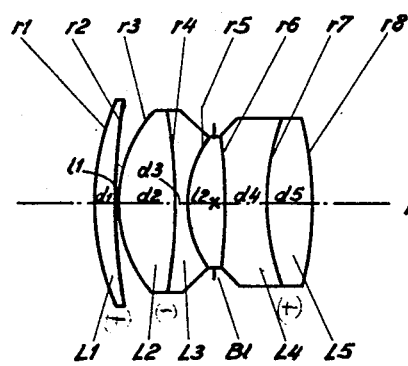
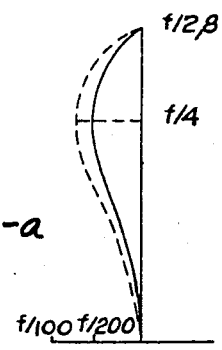
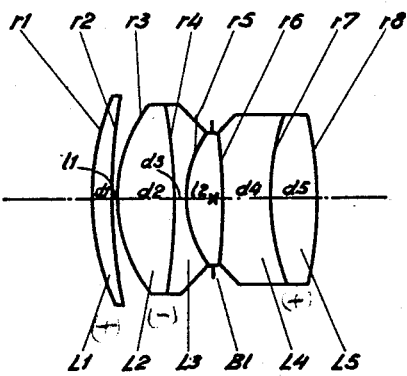
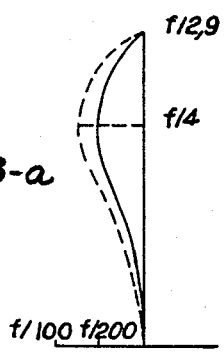
Inventor:
Ludwig Bertele
BY
ATTORNEYS Patented July 24, 1951

2,562,012

UNITED STATES PATENT OFFICE 2,562,012

THREE-COMPONENT OBJECTIVE LENS SYSTEM

Ludwig Bertele, Heerbrugg, Switzerland

Application September 9, 1948, Serial No. 48,509
In Switzerland September 13, 1947

2 Claims. (Cl. 88—57)

This invention relates to an improvement in objectives of the type in which two convergent components enclose a cemented meniscus which is curved sharply towards the object. The front component directed toward the object consists of an ordinary collecting lens. The central meniscus-shaped component consists of a convergent lens and a divergent lens with a thickness which is smaller than 22% of the total focus of the objective and a refractive index which is greater than the divergent lens. The rear component directed toward the image is composed of a divergent lens and a convergent lens with a convergent cemented surface bent toward the object. For an aperture ratio of about 1:2.8 it has been known, in objectives of this type, to provide a five-lens construction, but such a construction still suffered from the disadvantage of not rendering possible any sufficiently extensive course of the curve of spherical aberration, i. e. the zonal intermediate errors of spherical aberration remained too great.

Investigations have shown that it is possible, even with this sequence of lenses, to extend the curve of spherical aberration sufficiently if, according to the invention, the difference between the refractive indexes, applicable to the $d$ line of the spectrum, of the divergent lens and the convergent lens of the component directed toward the image is greater than 0.16. The curvature radius of the cemented surface of the rear component should be larger than 34% of the total focus of the objective and smaller than 60% thereof; furthermore, the curve of spherical aberration is improved if the sum of the refractive indexes for the $d$ line of the first and fifth lenses ($L_1$ and $L_5$) is greater than 3.300.

The method of reducing the zonal intermediate error of spherical aberration is illustrated by the following three examples shown diagrammatically in Figures 1, 2 and 3, respectively, of the appended drawing. Figures 1a, 2a and 3a show the corresponding aberration curves and illustrate the diminution of the zonal intermediate error of spheric aberration. Broken lines illustrate the corresponding aberration of known objective. It is possible, without difficulty, to increase further the sum of the refractive indexes of the first and fifth lenses if suitable kinds of glass are available.

The drawings and the following table illustrate the objective forming the basis of the invention. The data relate to a focal length of 100 mms. The aperture ratio is always 1:2.8. The image angle is 45–50°.

The references $r$ indicate the radii of curvature of the individual surfaces:

$d$—the thicknesses of the lenses
$l$—the air spaces between the individual lenses
$n$—the refractive indices; and
$v$—the Abbe numbers
$B_1$—the diaphragm.

Figure 1 and Example 1 show an objective consisting of five individual lenses; in this, $L_1$ is a simple lens, $L_2$ and $L_3$ a cemented meniscus which is curved towards the object, and having an axial thickness of 13.3 of the total focus, and $L_4$ and $L_5$ constitute a cemented convergent lens with a cemented surface bent toward the object and having a radius of curvature which is equal to 39.5% of the total focus. The difference between the refractive indexes of the diverging and converging lenses amounts to 0.19. The sum of the refractive indexes of the first and fifth lenses is 3.3014.

Figure 2 shows an objective with the same sequence of lenses as that shown in Figure 1. The axial thickness of the enclosed meniscus-shaped component is 13.3% of the total focus. The cemented surface in the rear component has a radius of curvature amounting to 41.9% of the total focus and the difference between the refractive indexes amounts to 0.19. The sum of the refractive indexes of the first and fifth lenses is 3.3422.

Figure 3 shows an objective with the same sequence of lenses as in the two preceding examples. The axial thickness of the enclosed meniscus-shaped component is 13.3% of the total focus. The cemented surface in the rear component has a radius of curvature amounting to 46% of the total focus of the objective and the difference between the refractive indexes of $L_4$ and $L_5$ amounts to 0.19. The sum of the refractive indexes of the first and fifth lenses is 3.3826. In this example, the zonal intermediate error of spherical aberration is the smallest.

Example 1

| | | | $n_d$ | $v$ |
|---|---|---|---|---|
| $L_1$ | $r_1=+\ 46.0$ | $d_1=\ 4.3$ | 1.6127 | 54.9 |
| | $r_2=+110.0$ | $l_1=\ 0.21$ | | |
| $L_2$ | $r_3=+\ 29.3$ | $d_2=11.0$ | 1.6530 | 46.2 |
| $L_3$ | $r_4=-\ 92.17$ | $d_3=\ 2.36$ | 1.7410 | 34.5 |
| | $r_5=+\ 21.675$ | $l_2=\ 6.95$ | | |
| $L_4$ | $r_6=-\ 90.0$ | $d_4=\ 7.0$ | 1.5012 | 56.6 |
| $L_5$ | $r_7=+\ 39.5$ | $d_5=10.0$ | 1.6913 | 54.9 |
| | $r_8=-\ 69.98$ | | | |

Example 2

| | | | $n_d$ | $v$ |
|---|---|---|---|---|
| $L_1$ | $r_1=+ 49.23$ | $d_1= 4.25$ | 1.65094 | 58.7 |
| | $r_2=+119.2$ | $l_1= 0.19$ | | |
| $L_2$ | $r_3=+ 29.17$ | $d_2=11.0$ | 1.65128 | 35.9 |
| | $r_4=-104.25$ | | | |
| $L_3$ | $r_5=+ 22.03$ | $d_3= 2.32$ | 1.74842 | 27.8 |
| | $r_6=- 86.92$ | $l_2= 6.95$ | | |
| $L_4$ | $r_7=+ 41.89$ | $d_4= 8.11$ | 1.50140 | 65.5 |
| $L_5$ | $r_8=- 68.75$ | $d_5= 9.07$ | 1.69130 | 54.9 |

Example 3

| | | | $n_d$ | $v$ |
|---|---|---|---|---|
| $L_1$ | $r_1=+ 52.52$ | $d_1= 4.04$ | 1.6913 | 54.9 |
| | $r_2=+123.07$ | $l_1= 0.19$ | | |
| $L_2$ | $r_3=+ 29.61$ | $d_2=10.96$ | 1.65301 | 46.2 |
| | $r_4=- 90.86$ | | | |
| $L_3$ | $r_5=+ 22.54$ | $d_3= 2.31$ | 1.7410 | 34.5 |
| | $r_6=- 82.69$ | $l_2= 6.92$ | | |
| $L_4$ | $r_7=+ 45.87$ | $d_4= 9.23$ | 1.50115 | 56.6 |
| $L_5$ | $r_8=- 66.15$ | $d_5= 8.17$ | 1.69130 | 54.9 |

I claim:

1. A five-lens objective consisting of three air-separated components in which the front component, directed toward the object, is a simple convergent lens, the enclosed meniscus-shaped component is bent toward the object and is composed of a convergent lens and a divergent lens with an axial thickness which is less than 22% of the total focus of the objective and a refractive index for the divergent lens which is greater than 1.640 and the rear component, directed toward the image, is composed of a divergent lens and a convergent lens with a convergent, cemented surface bent toward the object, characterised by the fact that the difference between refractive indexes for the $d$ line of said two lenses of the rear component is larger than 0.16 and that the cemented surface bent toward the object has a radius of curvature which is larger than 34% and smaller than 60% of the total focus of the objective.

2. An objective in accordance with claim 1, characterized in that the sum of the refractive indexes, applicable to the $d$ line of the spectrum, of the first and last lenses is greater than 3.300.

LUDWIG BERTELE.

REFERENCES CITED

The following references are of record in the file of this patent:

UNITED STATES PATENTS

| Number | Name | Date |
|---|---|---|
| 1,998,704 | Bertele | Apr. 23, 1935 |
| 2,124,356 | Rayton | July 19, 1938 |
| 2,186,622 | Bertele | Jan. 9, 1940 |